United States Patent [19]
Brink et al.

[11] Patent Number: 5,232,602
[45] Date of Patent: Aug. 3, 1993

[54] PHOSPHOROUS REMOVAL FROM TETRACHLOROSILANE

[75] Inventors: Robert G. Brink, St. Louis; Norman H. Deitering, Chesaning; Michael H. Greene; Kimmai T. Nguyen, both of Midland, all of Mich.

[73] Assignee: Hemlock Semiconductor Corporation, Hemlock, Mich.

[21] Appl. No.: 907,276

[22] Filed: Jul. 1, 1992

[51] Int. Cl.$^5$ .............................................. B01D 15/00
[52] U.S. Cl. .................................. 210/681; 210/688; 423/342
[58] Field of Search ............... 210/660, 688, 694, 681; 423/299, 300, 342

[56] References Cited

U.S. PATENT DOCUMENTS

| | | | |
|---|---|---|---|
| 2,971,607 | 2/1961 | Caswell | 55/73 |
| 3,188,168 | 6/1965 | Bradley | 423/342 |
| 3,252,752 | 5/1966 | Pohl et al. | 423/342 |
| 3,323,870 | 6/1967 | Baldrey et al. | 423/342 |
| 4,099,936 | 7/1978 | Tarancon | 55/75 |
| 4,374,110 | 2/1983 | Darnell et al. | 423/342 |
| 4,409,195 | 10/1983 | Darnell | 423/342 |
| 4,481,178 | 11/1984 | Kray | 423/342 |
| 4,676,967 | 6/1987 | Breneman | 423/342 X |
| 4,743,344 | 5/1988 | Breneman et al. | 423/342 X |
| 4,900,530 | 2/1990 | Anania et al. | 423/342 |

FOREIGN PATENT DOCUMENTS

| | | | |
|---|---|---|---|
| 57-156317 | 9/1982 | Japan | 423/342 |
| 60-090810 | 5/1985 | Japan | 423/342 |
| 61-097129 | 5/1986 | Japan | 423/342 |
| 02-153815 | 6/1990 | Japan | |

*Primary Examiner*—Robert Spitzer
*Attorney, Agent, or Firm*—William F. Boley

[57] ABSTRACT

The present invention relates to a method for the purification of tetrachlorosilane used for the manufacture of electronic grade silicon and, more particularly, to a method for removing trace impurities of phosphorus. The method involves contacting liquid tetrachlorosilane with activated charcoal. The process is effective in reducing the phosphorus levels in the tetrachlorosilane to the parts per trillion range. The process can be run as a continuous or batch process with easy separation of the activated charcoal containing the phosphorus contaminate from the tetrachlorosilane.

11 Claims, No Drawings

PHOSPHOROUS REMOVAL FROM TETRACHLOROSILANE

BACKGROUND OF INVENTION

This invention relates to purification of tetrachlorosilane used for the manufacture of electronic grade silicon and, more particularly, to a method for removing trace impurities of phosphorus. The method involves contacting liquid tetrachlorosilane with activated charcoal. The process is effective in reducing the phosphorus levels in the tetrachlorosilane to the parts per trillion range. The process can be run as a continuous or batch process, with easy separation of the activated charcoal containing the phosphorus contaminate from the tetrachlorosilane.

Monocrystalline silicon wafers of extremely high purity are required for the manufacture of integrated circuits. The purity of the monocrystalline silicon wafers is one factor that limits the density of the circuits that can be formed on the silicon wafers. Therefore, as attempts are made to increase the density of the circuits on monocrystalline silicon wafers there is a continuing need to reduce the level of impurities in the silicon wafers.

A standard process for producing monocrystalline silicon of high purity involves the chemical vapor deposition of hyperpure silane gas, for example tetrachlorosilane, onto a heated silicon element. The formed silicon ingot is then float zone processed into a monocrystalline rod which can be sliced into monocrystalline silicon wafers appropriate for forming integrated circuits.

Trace contamination in the silane deposition gas is a source of contamination in monocrystalline silicon wafers. Therefore, it is desirable to reduce the trace contaminate levels in the silane deposition gas as low as possible. Many impurities such as iron, copper, and manganese can be removed from the silanes for example, by distillation. However, phosphorus content cannot be reduced to desired levels by simple distillation because phosphorus tends to form compounds with properties similar to the silanes.

Previously proposed methods for the removal of phosphorus from silanes include for example, complexing of the phosphorus compounds with selected transitional metal compounds (Kray. U.S. Pat. No. 4.481.178. issued Nov. 6, 1984): reacting phosphorus impurities with iodine, bromine or chlorine to form high-boiling compounds which can be separated from the silanes (Bradley. U.S. Pat. No. 3,188,168, issued Jun. 8, 1965); the use of zeolite molecular sieves to separate the phosphorus compounds from the silanes (Caswell, U.S. Pat. No. 2,971,607, issued Feb. 14. 1961): and reacting chlorosilanes in the presence of oxygen at a temperature of about 60° C. to 300° C. to form Si—OH species which complex with impurities such as $PCl_3$ (Darnell et al., U.S. Pat. No. 4.409.195. issued Oct 11. 1983).

The present activated charcoal method offers advantages over these previously described processes in that the present method can easily remove phosphorus from tetrachlorosilane in the parts per trillion range. In addition, the present process can be run at near room temperature and separation of the purified tetrachlorosilane from the activated charcoal can be accomplished simply.

Ogi et al., JP Kokai Pat. No. Hei 2(1990)-153815. describes a method for purification of chloropolysilanes by contacting with activated carbon. Tarancon, U.S. Pat. No. 4,099.936. issued Jul. 11, 1978. describes a multi-stage process where at least one stage can comprise contacting a silane in the gas phase with activated charcoal at a temperature of minus 10° C. to 50° C. to remove impurities.

SUMMARY OF INVENTION

The present invention relates to a method for the purification of tetrachlorosilane used for the manufacture of electronic grade silicon and, more particularly, to a method for removing trace impurities of phosphorus. The method involves contacting liquid tetrachlorosilane with activated charcoal. The process is effective in reducing the phosphorus levels in the tetrachlorosilane to the parts per trillion range. The process can be run as a continuous or batch process with easy separation of the activated charcoal, containing the phosphorus contaminate from the tetrachlorosilane.

DESCRIPTION OF INVENTION

The present invention is a method for reducing the phosphorus contamination of tetrachlorosilane. The method comprises: contacting liquid tetrachlorosilane having a minor phosphorus component therein with activated charcoal.

Contact of the liquid tetrachlorosilane with the activated charcoal can be conducted as a batch process or as a continuous process. A preferred method is a continuous process where the activated charcoal is present as a fixed-bed.

By "activated charcoal" is meant a nearly chemically pure amorphous carbon made by carbonizing and treating dense materials such as coconut shells, peach pits, hardwoods, and the like. A preferred activated charcoal is that made from carbonized coconut shells. The activated charcoal can be in the form of, for example, particles, flakes, chips, or powders. The optimum size for the activated charcoal represents a trade-off between available surface area and the ability to create a packed column with an adequate flow rate. Generally, activated charcoal within a mesh range of about 100 mesh to 2 mesh is considered useful. A preferred size range is about 4 to 6 mesh.

The optimum weight of activated carbon to volume of tetrachlorosilane contacted will depend on such factors as the amount of phosphorus in the liquid tetrachlorosilane, the contact temperature, and the type and size of the activated charcoal. The examples provided herein provide a general starting point from which one skilled in the art can readily determine the optimum weight of activated carbon to be employed.

The temperature at which the liquid tetrachlorosilane is contacted with the activated charcoal can be within a range of about 0° C. to 50° C. Preferred is a temperature within a range of about 20° C. to 40° C.

Optimum contact time for the activated charcoal with the liquid tetrachlorosilane will depend upon the particular activated charcoal employed. In general, when the activated charcoal is carbonized coconut shell a contact time from about 0.5 minute to 20 minutes is considered useful. Longer contact times may be employed, but appear to offer no advantage. A preferred contact time is about one minute to six minutes.

The present method is one for reducing a minor phosphorus component contained in liquid tetrachlorosilane. By "minor phosphorus component" is meant those phosphorus levels typically associated with electronic grade tetrachlorosilane. For example, the present method is considered useful for further reducing phosphorus initially present in the tetrachlorosilane at parts per billion atomic (ppba). The present process is considered especially useful for reducing the level of $PCl_3$ typically found in electronic grade tetrachlorosilane. The inventors theorize that $PCl_3$ is bound to the activated charcoal by an essentially irreversible chemisorption process under the conditions of the present method. However, this theory is not meant to limit the claims herein.

The following examples are provided to facilitate understanding of the present invention and to demonstrate the effectiveness thereof. The examples are not intended to limits the scope of the claims provided herein.

EXAMPLE 1

Electronic grade tetrachlorosilane containing about 0.53 ppba phosphorus was contacted with a bed of activated charcoal. Liquid tetrachlorosilane was passed from a storage cylinder to a stainless steel column 58 cm in length and 9 cm in diameter containing a 2.5 kg bed of activated charcoal, at a rate of 600 ml per minute, and then to a stainless steel collection cylinder. This corresponded to a contact time for the tetrachlorosilane with the activated charcoal of about six minutes. The activated charcoal was Chlorosorb(R) obtained from Chemical Design. Inc., Lockport, NY. The activated charcoal had an average particle size of about 4 mesh and was formed from carbonized coconut shells. The bed of activated charcoal was maintained at a temperature of about 25° C. Approximately 50 kg of the effluent from the column was collected in the collection cylinder.

The purified tetrachlorosilane, collected in the collection cylinder, was then vaporized in a hydrogen gas flow and fed to a standard process for the chemical vapor deposition of polycrystalline silicon. The formed ingot was float-zoned to a single crystal and sliced into wafers by standard techniques. The prepared wafers were evaluated for phosphorus by photoluminescence spectroscopy. The phosphorus level in the prepared wafer was determined to be about 0.37 ppba. After correcting for process contribution to the phosphorus content of the silicon wafer, typically about 0.15 ppba, actual decrease in phosphorus content of the activated charcoal contacted tetrachlorosilane was about 42 percent.

EXAMPLE 2

Tetrachlorosilane was contacted with activated charcoal in a process similar to that described in Example 1. with the exception that the column containing the activated charcoal was immersed in a 38° C. hot water bath. The phosphorus content of the prepared wafer was about 0.32 ppba. This phosphorus content, after correction for process contribution to the phosphorus content amounted to about a 55 percent decrease in the phosphorus level of the tetrachlorosilane by contacting with the activated charcoal.

EXAMPLE 3

Tetrachlorosilane was contacted with activated charcoal in a process similar to that described in Example 1. with the exceptions that the column containing the activated charcoal was immersed in a 38° C. hot water bath and the flow rate of tetrachlorosilane through the column was reduced to about 300 ml per minute. Monocrystalline silicon wafers were prepared and analyzed for phosphorus as described in Example 1. The phosphorus content of the prepared silicon wafers was about 0.32 ppba. This phosphorus content, after correction for process contribution to the phosphorus content amounted to about a 55 percent decrease in the phosphorus content in the tetrachlorosilane after contacting with the activated charcoal.

EXAMPLE 4

(Not Within Scope of Present Invention)

Tetrachlorosilane in the vapor phase was contacted with activated charcoal. Tetrachlorosilane containing about 0.4 ppba phosphorus was vaporized into a flowing hydrogen gas stream at a saturation concentration of about 8 mole percent tetrachlorosilane and passed through a column of charcoal similar to that described in Example 1. Flow rate through the column was about 20 L/min. The temperature of the column was about 25° C. The gas stream exiting the column was passed directly to a standard chemical vapor deposition process for producing polycrystalline silicon. Monocrystalline wafers were prepared and analyzed for phosphorus as described in Example 1. The phosphorus level in the monocrystalline wafer increased from about 0.4 ppba to 2.5 ppba.

EXAMPLE 5

(Not Within Scope of Present Invention)

Trichlorosilane was treated and analyzed by methods similar to those described in Example 1. The initial concentration of phosphorus in the liquid trichlorosilane was about 0.7 ppba. Monocrystalline silicon wafers cut from a first rod prepared from the trichlorosilane after contact with activated charcoal had a phosphorus content of about 8 ppba. Monocrystalline silicon wafers prepared from a second rod prepared from the same trichlorosilane had a phosphorus content of about 0.8 ppba. The inventors believe that these results occur because the activated charcoal is acting as a catalyst in the presence of the trichlorosilane to form volatile phosphorus species which distilled off during preparation of the first silicon rod.

We claim:

1. A method for reducing the phosphorus content of tetrachlorosilane, the method comprising: contacting liquid tetrachlorosilane having a minor phosphorus component therein with activated charcoal.

2. A method according to claim 1, where the phosphorus component is $PCl_3$.

3. A method according to claim 1, where the contacting of liquid tetrachlorosilane having a minor phosphorus component therein with activated charcoal is conducted at a temperature within a range of about 0° C. to 50° C.

4. A method according to claim 1, where the contacting of liquid tetrachlorosilane having a minor phosphorus component therein with activated charcoal is conducted at a temperature within a range of about 20° C. to 40° C.

5. A method according to claim 1, where the process is conducted as a continuous process employing a fixed-bed of activated charcoal.

6. A method according to claim 1, where the activated charcoal is prepared by the carbonization of coconut shells.

7. A method according to claim 1, where contact time of the tetrachlorosilane with the activated charcoal is within a range of about 0.5 minute to 20 minutes.

8. A method according to claim 1, where contact time of the tetrachlorosilane with the activated charcoal is within a range of about 0.5 to 20 minutes.

9. A method according to claim 1, where the activated charcoal is of a size within a mesh range of about 80 to 100 mesh to a mesh range of about 2 to 8 mesh.

10. A method for reducing the phosphorus content of tetrachlorosilane, the method comprising:

contacting liquid tetrachlorosilane having a minor phosphorus component comprising $PCl_3$ therein with activated charcoal prepared by the carbonization of coconut shells, at a temperature within a range of about 20° C. to 40° C., for a time within a range of about one minute to six minutes.

11. A method for reducing the phosphorus content of electronic grade tetrachlorosilane, the method comprising contacting liquid electronic grade tetrachlorosilane with an amount of activated charcoal sufficient to reduce the phosphorus content of the liquid electronic grade tetrachlorosilane below 0.50 ppba.

* * * * *